United States Patent Office 3,548,015
Patented Dec. 15, 1970

3,548,015
PURIFICATION OF TETRAFLUOROETHYLENE
Takuo Kawamura, Settsu-shi, Japan, assignor to Daikin Kogyo Kabushiki Kaisha, Osaka-shi, Japan, a juridical person of Japan
No Drawing. Filed Dec. 11, 1968, Ser. No. 783,107
Claims priority, application Japan, Dec. 13, 1967, 42/80,206
Int. Cl. C07c 21/18
U.S. Cl. 260—653.3      6 Claims

ABSTRACT OF THE DISCLOSURE

Process for purifying impure tetrafluoroethylene containing hexafluoropropylene as an impurity which comprises contacting said impure tetrafluoroethylene with granular soda lime.

---

This invention relates to the purification of tetrafluoroethylene, more particularly to a process for purifying tetrafluoroethylene contaminated with hexafluoropropylene.

In the production of tetrafluoroethylene by the pyrolysis of monochlorodifluoromethane, a considerable amount of hexafluoropropylene is produced as a by-product with the desired tetrafluoroethylene. Although such hexafluoropropylene may be removed by rectification to a certain extent, it still remains in tetrafluoroethylene in an amount slight as less than 100 p.p.m. by volume unless by complicated procedures. The presence of such a slight amount of hexafluoropropylene in tetrafluoroethylene is not desirable in the production of unsintered tape of polytetrafluoroethylene prepared by emulsion polymerization from such impure tetrafluoroethylene. That is, unsintered tape having sufficient width can not be obtained due to poor malleability of the polytetrafluoroethylene, when produced by calendering of the rod extruded by paste extrusion of the polytetrafluoroethylene.

An object of the invention is accordingly to provide a process for purifying tetrafluoroethylene contaminated with hexafluoropropylene by a simple procedure.

Another object of the invention is to provide the purified tetrafluoroethylene free from the contamination with hexafluoropropylene.

According to the process of the present invention, impure tetrafluoroethylene containing a slight amount of hexafluoropropylene as an impurity is brought into contact with granular soda lime, whereby the impurity, hexafluoropropylene is absorbed selectively without any loss of the tetrafluoroethylene and the purified tetrafluoroethylene which contains none or less than 0.1 p.p.m. by volume of hexafluoropropylene is obtainable.

Soda lime is known in the art as absorbent of carbon dioxide but nothing is reported about the fact that the soda lime absorbs hexafluoropropylene selectively without any absorbing effect on tetrafluoroethylene; the fact first discovered by the present inventor. In the invention soda lime is used in the form of grains. The granular size is not critical and may vary over a wide range, but those passing through a screen having sieve opening of 25.000 mm. square, particularly of 10.000 mm. square, but not passing through a screen with openings of 0.125 mm. square, particularly of 0.250 mm. square, are preferable.

The impure tetrafluoroethylene to be treated in the invention contains as an impurity hexafluoropropylene in various amounts, and particularly the process of the invention is effective for purifying tetrafluoroethylene containing hexafluoropropylene in a slight amount of 1.0 to 100 p.p.m. by volume which was so far difficult to separate by the conventional methods. Accordingly, the tetrafluoroethylene prepared by the thermal decomposition of monochlorodifluoromethane and refined by the conventional methods such as washing with water, alkali and acid, rectification, etc. may be advantageously treated by the method of the invention to produce purified tetrafluoroethylene containing none or less than 0.1 p.p.m. by volume of hexafluoropropylene.

According to one of the preferred embodiments of the invention the granular soda lime is charged in an absorption tower or tube and the impure tetrafluoroethylene to be treated is passed through the layer of the soda lime to separate the impurity, hexafluoropropylene. Usually the absorption treatment is carried out at room temperatures under atmospheric pressures, although reduced or elevated temperatures ranging from 0 to 100° C. may be applied and increased pressures of not higher than 30 kg./cm.² gauge may also be applied. A contact time of 1 to 300 seconds, preferably 3 to 200 seconds, is sufficient for the purpose. Throughout the specification and claims the contact time is defined by the following equation:

$$\text{Contact time} = \frac{V}{R} \times (P+1) \times 60 \text{ (sec.)}$$

wherein R represents the volume of gas (ml./min.), which was introduced under treatment conditions for one minute, calculated at 25° C. and 0 kg./cm.² gauge pressure; V is apparent volume in ml. of charged soda lime; and P is operating pressure (kg./cm.² gauge).

For fuller understanding of the invention examples are given below.

EXAMPLE 1

A copper tube of 4 mm. inner diameter was charged with 10 grams of soda lime having an apparent volume of 12.73 ml. and passing through a screen of a sieve opening of 0.84 mm. square but not passing through that of 0.250 mm. square. Tetrafluoroethylene containing 15 p.p.m. by volume of hexafluoropropylene was passed through the tube at a flow rate of 40 ml./min. while maintaining a temperature of the soda lime layer at 25° C. The pressure at the inlet was 0.2 kg./cm.² gauge and that at the outlet was 0 kg./cm.² gauge. The contact time was 19–23 seconds. The gas exhausted from the tube was analyzed by gas chromatography being capable of detecting a concentration of a low as 0.1 p.p.m. by volume, whereby no trace of hexafluoropropylene was observed.

For comparison, 30 grams of diatomaceous earth coated with 10 grams of sodium hydroxide and 10 grams of quick lime were respectively used in place of 10 grams of soda lime and the same impure tetrafluoroethylene as in Example 1 was treated in the same manner as in Example 1. The hexafluoropropylene in the exhausted gases was 15 p.p.m. by volume respectively.

EXAMPLE 2

The same impure tetrafluoroethylene was treated in the same manner as in Example 1 except that the temperature of the soda lime layer was maintained at 50° C. The gas chromatographic analysis of the resultant tetrafluoroethylene as in Example 1 gave no trace of hexafluoropropylene.

EXAMPLE 3

The same impure tetrafluoroethylene was treated in the same manner as in Example 1, in which the pressure at the inlet was 3.2 kg./cm.² and that at the outlet was 3.0 kg./cm.² and the contact time was 60–80 seconds. The gas chromatographic analysis the same as in Example 1 gave no trace of hexafluoropropylene.

EXAMPLE 4

The same impure tetrafluoroethylene was treated in the same manner as in Example 1 except that the tetrafluoroethylene was passed through at the flow rate of 200 ml./min. The pressure at the inlet was 1 kg./cm.$^2$ gauge and that at the outlet was 0 kg./cm.$^2$ gauge. The contact time was 3.8–7.6 seconds. The gas chromatographic analysis of the resultant tetrafluoroethylene, as in Example 1, gave no trace of hexafluoropropylene.

EXAMPLE 5

The same impure tetrafluoroethylene was treated in the same manner as in Example 4 except that the temperature of the soda lime layer was maintained at 50° C.

The gas chromatographic analysis of the resultant tetrafluoroethylene, as in Example 1, gave no trace of hexafluoropropylene.

EXAMPLE 6

A glass column 40 mm. in inner diameter was charged with 200 grams of soda lime having an apparent volume of 254.6 ml. and passing through a screen of a sieve opening of 5.66 mm. square but not passing through that of 2.00 mm. square. Tetrafluoroethylene containing 60 p.p.m. of hexafluoropropylene was passed through the column at the flow rate of 80 ml./min. while maintaining a temperature of the soda lime layer at 25° C. The pressure at the inlet was about 0.01 kg./cm.$^2$ gauge and that at the outlet was 0 kg./cm.$^2$ gauge. The contact time was about 190 seconds. The gas chromatographic analysis of the resultant tetrafluoroethylene, as in Example 1, gave no trace of hexafluoropropylene.

EXAMPLE 7

The same impure tetrafluoroethylene was treated in the same manner as in Example 6 except that the tetrafluoroethylene was passed through at the flow rate of 400 ml./min. The pressure at the inlet was about 0.05 kg./cm.$^2$ gauge and that at the outlet was 0 kg./cm.$^2$ gauge. The contact time was about 40 seconds. The gas chromatographic analysis of the resultant tetrafluoroethylene, as in Example 1, gave no trace of hexafluoropropylene.

EXAMPLE 8

The same impure tetrafluoroethylene was treated in the same manner as in Example 6 except that 200 grams of soda lime having an apparent volume of 254.6 ml. and passing through a screen of a sieve opening of 9.52 mm. square but not passing through that of 4.00 mm. square was used. The contact time was about 190 seconds.

The gas chromatographic analysis of the resultant tetrafluoroethylene, same as in Example 1, gave no trace of hexafluoropropylene.

What I claim is:

1. A process for purifying impure tetrafluoroethylene containing hexafluoropropylene as an impurity which comprises contacting said impure tetrafluoroethylene with granular soda lime.

2. The process for purifying impure tetrafluoroethylene containing hexafluoropropylene as an impurity according to claim 1, in which said impure tetrafluoroethylene contains hexafluoropropylene in a range of 1.0 to 100 p.p.m. by volume.

3. The process for purifying impure tetrafluoroethylene containing hexafluoropropylene as an impurity according to claim 1, in which said impure tetrafluoroethylene is contacted with said soda lime for 1 to 300 seconds.

4. The process for purifying impure tetrafluoroethylene containing hexafluoropropylene as an impurity according to claim 3, in which said contact time is in the range of 3 to 200 seconds.

5. The process for purifying impure tetrafluoroethylene containing hexafluoropropylene as an impurity according to claim 1, in which said granular soda lime is one passing through a screen having a sieve opening of 25.000 to 0.125 mm. square.

6. The process for purifying impure tetrafluoroethylene containing hexafluoropropylene as an impurity according to claim 5, in which said granular soda lime is one passing through a screen having a sieve opening of 10.000 to 0.250 mm. square.

References Cited

UNITED STATES PATENTS 3,218,364  11/1965  Kometani et al.
3,458,584  7/1969  Regan.

DANIEL D. HORWITZ, Primary Examiner